J. H. EATMAN.
Animal Trap.

No. 230,182.  Patented July 20, 1880.

Witnesses:
F. Ourrand
E. H. Bradford

Inventor:
J. H. Eatman
By H. J. Ennis
Atty

UNITED STATES PATENT OFFICE.

JOHN H. EATMAN, OF CLINTON, ALABAMA.

ANIMAL-TRAP.

SPECIFICATION forming part of Letters Patent No. 230,182, dated July 20, 1880.

Application filed December 30, 1879.

*To all whom it may concern:*

Be it known that I, JOHN H. EATMAN, of Clinton, in the county of Greene and State of Alabama, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in animal-traps; and it has for its object to provide a trap that will automatically set itself after being sprung, and be held in position for the next succeeding animal or animals, and which will be automatically sprung by the weight of the animal upon seizing the bait, so as to insure the capture of the animal upon the mere attempt to seize the bait.

Heretofore in this class of traps the trap has been sprung by the tugging or pulling of the animal upon the bait, and as thus constructed the trap fails occasionally by the slipping of the bait, if not securely fastened, and also because the animal often refuses the bait. In the trap as at present constructed these objections are obviated, as any attempt of the animal to approach the bait will invariably spring the trap, as more fully hereinafter specified.

To this end the invention consists in a rectangular or other shaped vessel capable of holding water, having at its top, or near the same, a pivoted counterbalanced platform and a spring-catch for holding the platform in a set position, the said spring-catch having a lever carrying a smaller platform, to which the bait is secured, which will be operated by the weight of the animal seizing the bait, to release the main platform and precipitate the animal into the water in the lower part of the vessel, as more fully hereinafter specified.

Figure 1:
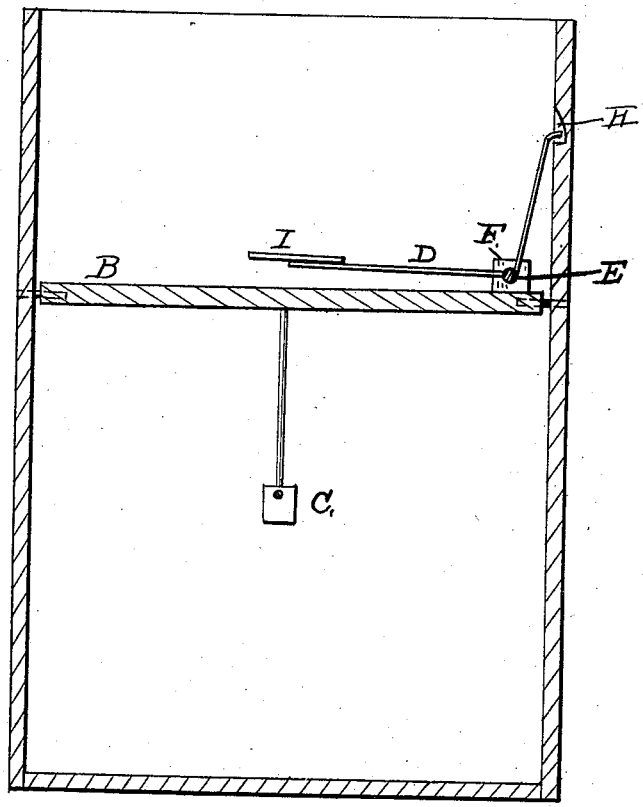
Figure 2:
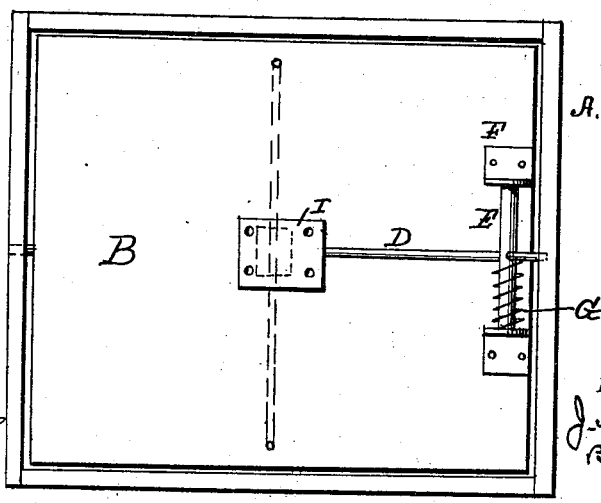

In the drawings, Figure 1 represents a vertical section of my improved trap, and Fig. 2 a top view of said trap.

The letter A indicates a vessel, of rectangular or other shape, capable of holding water, and B a platform pivoted near the upper part of the same, and provided with a counter-balance, C, which holds and returns said platform to a normal position.

The letter D indicates an angle-lever secured to a rock-shaft, E, pivoted in bearings F attached to the platform B, the said rock-shaft being provided with a spring, G, which holds it in a normal position, said lever, rock-shaft, and spring constituting a spring-catch adapted to engage a recess, H, in the side of the vessel A and hold the platform B in a set position.

The letter I indicates a small platform secured to the lever D, to which the bait is securely attached.

The operation of my invention is as follows: The trap in its normal position, as shown in Fig. 1, has the platform securely held by the spring-catch. When the animal, in seeking the bait, depresses the angle-lever the main platform is released and the weight of the animal tips the trap, precipitating the animal into the water in the lower part of the trap.

The trap as thus constructed can be employed for animals of large size by sinking a pit in the earth and supporting the counterbalanced platform and its attachments in a suitable frame in said pit.

Having described my invention, what I claim, and desire to secure by Letters Patent, is—

The centrally-pivoted platform B, having the counter-balance C, rock-shaft E, angle-lever D, and spring G, in combination with the recessed portion of the trap, the whole constructed and arranged substantially as and for the purpose specified.

In testimony that I claim the foregoing I have hereunto set my hand this 20th day of November, 1879.

JOHN H. EATMAN.

Witnesses:
E. J. BUTLER,
R. G. MARSHALL.